United States Patent [19]

Nilsson

[11] 4,158,692
[45] Jun. 19, 1979

[54] METHOD FOR THE TREATMENT OF RIGID PLASTIC CONTAINERS

[75] Inventor: Ingvar E. Nilsson, Akarp, Sweden

[73] Assignee: Tetra Pak Developpement SA, Lausanne, Switzerland

[21] Appl. No.: 784,592

[22] Filed: Apr. 4, 1977

[30] Foreign Application Priority Data

Apr. 20, 1976 [SE] Sweden ................................ 7604510

[51] Int. Cl.² ............................................. B29C 17/00
[52] U.S. Cl. .................................. 264/320; 264/296; 425/392; 425/403
[58] Field of Search ...................... 264/296, 320, 322; 425/525, 392, 393, 403

[56] References Cited

U.S. PATENT DOCUMENTS

| | | | |
|---|---|---|---|
| 3,103,170 | 9/1963 | Covington, Jr. et al. | 264/320 UX |
| 3,278,665 | 10/1966 | Harrison | 264/97 X |
| 3,846,531 | 11/1974 | Reilly | 264/296 X |
| 3,929,960 | 12/1975 | Findlay et al. | 264/296 X |

Primary Examiner—Jan H. Silbaugh
Attorney, Agent, or Firm—Burns, Doane, Swecker & Mathis

[57] ABSTRACT

A method and an apparatus for treating mouth areas of rigid plastic containers in order to prevent cracking during the capping of the containers. The width of the mouth opening of the container is prior to capping temporarily increased by means of a mandrel, which at a relatively low speed is introduced into the mouth opening. This results in a cold working and stretching of the plastic material adjacent to the opening and when the mandrel after a short while is with-drawn from the mouth opening the plastic material around the same is given a molecular orientation in the circumferential direction. The preferred apparatus includes fixing elements for holding a container so that its mouth opening is aligned with the mandrel, which is cylindrical with a somewhat greater diameter than the mouth opening and axially displaceable into the mouth opening.

8 Claims, 3 Drawing Figures

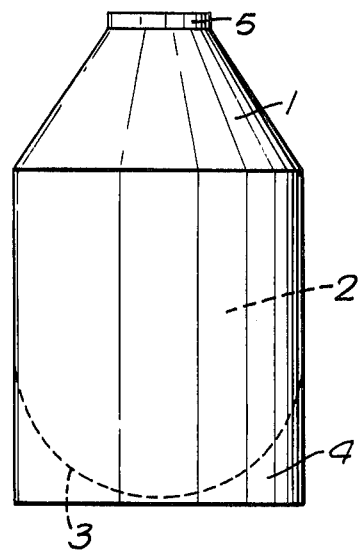
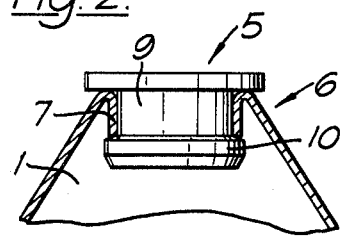
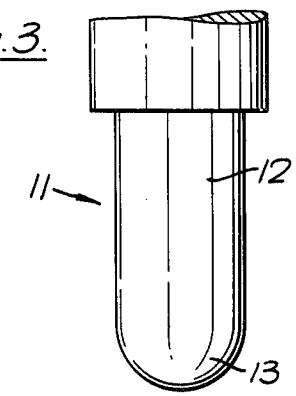
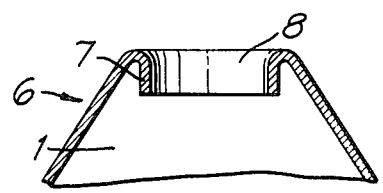

METHOD FOR THE TREATMENT OF RIGID PLASTIC CONTAINERS

The present method relates to a method for the treatment of substantially bottle-shaped containers of rigid plastics, in particular PVC or acrylonitrile-based plastics, with the object of increasing the capacity to resist mechanical stresses in the mouth area of the container which occur in connection with the closing of the container.

It is known that one-way packages of the bottle-type for e.g. liquid foodstuffs are manufactured from different types of plastics, e.g. polyvinyl chloride (PVC) or acrylonitrile-based plastics. These and similar types of plastics are suitable for the manufacturing of packing containers, since they can be relatively easily thermoformed to the desired shape by deep drawing from a web. The said rigid plastics also provide finished packing containers of the desired rigidity and stability.

A known packing container or bottle of the said type which is largely used for pressurized contents, e.g. beer, is manufactured from web-shaped acrylonitrile-based plastics. From the plastic web heated to softening temperature two parts are punched out and formed, namely an upper, substantially conical top part which is provided with an emptying hole, and a lower substantially cylindrical container part with a hemi-spherical base. After forming, the parts are joined together and the lower, substantially cylindrical part is provided with an envelopping casing of paper which apart from strengthening the bottle also serves as a decoration surface and gives the flask a base surface so that it can firmly stand.

The manufacture of packing containers or bottles described occurs at a central place where packages are manufactured in large numbers to be transported later to breweries situated in the surrounding districts where they are filled with beer and closed. The closing takes place in that a cap manufactured from a relatively soft plastic material is pressed down into the mouth opening. The pressing down of the cap takes place at great speed and it has been found that the strong stress exercized on the area around the mouth opening gives rise to the appearance of cracks. The cracks are very small but, since the pressure in a package filled with beer is appreciable, even small cracks lead to leakage. Crack formation is particularly common when the bottles during filling are at a low temperature which is fairly common, since the bottles before filling are often kept in cold storage and thus are at a temperature which substantially corresponds to the outside temperature. Even if this is not the case and the bottles are kept inside the building, they are cooled down strongly when they are filled with beer which occurs directly before the fitting of the cap, since the beer has to be filled at low temperature of about 4° C.

It is an object of the present invention to provide a method for the treatment of bottle-shaped containers so as to prevent crack formation on capping.

It is a further object of the present invention to provide a method for the treatment of bottle-shaped containers so as to prevent crack formation on capping, which method does not bring about a lowering of the rate of production or of the quality of the contents.

These objects have been achieved in accordance with the invention in that a method for the treatment of substantially bottle-shaped containers of rigid plastics, in particular PVC of acrylonitrilebased plastics, with the object of increasing the capacity to resist mechanical stresses in the mouth area of the container which occur in connection with the closing of the container, is given the characteristic that the mouth area after completion of the forming process proper is subjected to a mechanical processing which molecular-orientates the plastic material.

It is a further object of the present invention to provide an arrangement for the carrying out of the method in accordance with the invention, which object is achieved in that an arrangement is given the characteristic that it comprises elements for the fixing of a container with the mouth opening just opposite a mandrel, which is arranged to be displaced axially into the mouth opening and has a substantially cylindrical shape with a greater diameter than the mouth opening and a tapering front end.

Preferred embodiments of the method and of the arrangement in accordance with the invention have been given the characteristics which are evident from the subsidiary claims.

In the following the invention will be described with reference to the enclosed schematic drawing, wherein FIG. 1 shows a packing container of a known type, FIG. 2 is a section through the upper part of the packing container according to FIG. 1 and FIG. 3 is a section through the upper part of a packing container according to FIG. 1 before the fitting of the cap and in connection with the carrying out of the method in accordance with the invention.

In FIG. 1 is shown a packing container or bottle of a known type. The packing container comprises a substantially conical upper part 1 which is manufactured from acrylonitrile-based rigid plastics. The part 1 is joined in an impervious manner to a lower substantially cylindrical container part 2 which is likewise manufactured from acrylonitrile-based rigid plastics. The substantially cylindrical part 2 is closed at its lower end by a hemispherical base part 3 made in one piece. The cylindrical part 2 as well as the base part 3 are envelopped by a cylindrical casing 4 of paper which extends a little below the hemispherical base part 3 of the cylindrical part 2 and forms a standing surface for the bottle. A mouth opening arranged at the upper end of the bottle is closed by means of a cap 5 made of relatively soft plastics.

FIG. 2 is a section through the upper part of the top part 1 of the packing container shown in FIG. 1. It is evident from the figure, that the top part 1 at its upper end has a mouth area 6 in which an inward-flanged neck part 7 of the top part delimits a mouth opening 8 (FIG. 3). The cap 5 is applied to the mouth opening 8. The cap has an elongated, substantially cylindrical portion 9 which at the lower end of the cap is delimited by a flange 10 provided with a conical entering surface. The flange 10 rests against the bottom end of the inward-flanged neck part 7 and thereby retains the cap in the mouth opening.

When the packing container or the bottle, after filling with the desired contents, e.g. beer, is to be provided with a cap, the bottle is placed in a capping machine in such a position that the mouth opening is straight under a mandrel which on its bottom end carries a cap 5. During capping the mandrel is moved relatively quickly downwards in the direction of the mouth opening, the flange 10 of the cap 5 being pressed down into the mouth opening 8. The introduction into the mouth opening is facilitated by the edges of the mouth opening being rounded, and by the flange 10 being provided at its bottom end with a conical entering surface. Since the cap is manufactured from a relatively soft material, the same can be compressed so that subject to a certain widening of the neck part 7 of the mouth opening 8 it can pass through the same to expand again when the cap 5 has arrived in the position as shown in FIG. 2.

Owing to the high speed and force with which the cap 5 is applied, fine cracks often arose up to now in the neck part 7 during application. This is due largely to the rigid plastic material of which the packing container is made having a great tendency to crack when being subjected to deformation in cold condition. This tendency to cracking is further accentuated by the fact that the material in the mouth area 6, as a result of the forming process during the manufacture of the upper part 1, has received an axial molecular orientation which brings about a greatly increased risk of axial crack formation. This risk is further increased, as mentioned earlier, if the packing container is strongly cooled which does in fact happen, since the tapping of beer of a temperature of approx. 4° C. which is carried out directly before capping, certainly cools down the bottle to a corresponding temperature. Moreover, if the bottle prior to filling has been taken in from cold storage, it may in winter time often be at a temperature down to a few degrees below freezing.

It has been found that crack formation can be completely eliminated by the method and arrangement in accordance with the invention which will be described in detail in the following with special reference to FIG. 3 which shows a section through the upper part of a top part 1. The figure shows a mouth opening 8 with inward-flanged neck part 7 in which crack formation has been particularly common. By the method in accordance with the invention a special mechanical processing of the area of the mouth opening, which is critical in respect of crack formation, is carried out, which processing consists of a mandrel 11, with a substantially cylindrical surface 12 and a hemi-spherical end part 13 adjoining the same, being lowered into the mouth opening. The cylindrical part 12 of the mandrel 11 has a diameter which exceeds the inside diameter of the mouth opening 8 by 4-12%, so that the introduction of the mandrel 11 into the mouth opening temporarily widens the same and somewhat increases its diameter. This widening brings about a processing and stretching of the material in the inward-flanged neck part 7, so that the same is molecular-orientated in circumferential direction, which together with the original axial molecular orientation results in that the material in the neck part 7 obtains a biaxial orientation which appreciably increases the capacity of the material to undergo mechanical stresses without crack formation. This processing of the mouth opening is a cold working, that is to say, it takes place when the plastic material in the mouth opening has a temperature which is lower than its softening temperature. However, the processing takes place within such a time after the forming of the upper part of the bottle 1 that the plastic temperature is somewhat higher than ambient temperature, preferably between 25 and 75° C. The introduction of the mandrel 11 takes place at a relatively low speed and the mandrel is allowed to remain in the mouth opening for 2-3 seconds. A typical value for the speed of introduction is 0.2 m/s, and as an example of the dimensions actually occurring in this connection, it can be said that the mouth opening before processing by means of the mandrel 11 has a diameter of 20.0 mm, that the mandrel 11 in its cylindrical part 12 has a diameter of 21.4 mm and that the mouth opening 8 after the withdrawal of the mandrel has a diameter of approx. 20.2 mm. From this it is evident that the widening of the mouth opening caused by the mandrel is small (0.5-3%, preferably 1%); what is in fact decisive for preventing crack formation in the subsequent capping is the molecular orientation of the plastic material in the neck part 7.

An arrangement for the carrying out of the method in accordance with the invention is of very simple design and can advantageously be integrated into the pressure testing station where packing containers of this type are subjected to a tightness test after manufacture. The arrangement comprises a mandrel 11 which is axially displaceable so that it can be introduced into the packing container held in place by fixing elements, not shown on the drawing. The mandrel 11 comprises a substantially cylindrical portion 12 and a tapering front end 13 which appropriately is of hemispherical shape.

If the packing container after manufacture is to be subjected to a pneumatic pressure test, which is often the case, the arrangement in accordance with the invention can be integrated with the pressure testing station. The mandrel 11 is then provided with an axial passage for compressed air which ends at the bottom end of the mandrel. When a packing container reaches the pressure testing station, it is fixed in position underneath a mandrel 11, which is then introduced into the mouth opening of the packing container, and widens the same whilst being in tight contact with the inner surface of the neck part 7. At the same time the pressure testing of the packing container is carried out by introducing compressed air into it via the said duct in the mandrel 11. The pressure is maintained during a certain time, whereupon any pressure difference that arises is measured and the mandrel 11 is withdrawn from the mouth opening 8. In this manner the processing of the neck part 7 can be carried out simultaneously with the normal manufacturing procedure and without using up any further time.

I claim:

1. A method of cold-working a substantially bottle-shaped container having a neck portion, an opening adjacent thereto and being constructed of a plastic material, said method comprising the steps of:
    (a) maintaining the temperature of the container below the softening temperature of the plastic material;
    (b) maintaining the neck portion in an unrestrained state to permit expansion of said neck portion;
    (c) inserting a mandrel into the opening thereby increasing the size of the opening and the adjacent neck portion;
    (d) maintaining the mandrel in the opening for a period of time; and
    (e) withdrawing the mandrel from the opening, wherein the size and shape of the mandrel, the rate of insertion of the mandrel into the opening and the period of time the mandrel is maintained in the opening are selected to orient the plastic material of the neck portion in a circumferential direction to thereby obtain biaxial orientation and to increase the resistance of the plastic material of the neck portion to mechanical stresses without the formation of cracks.

2. The method of claim 1 wherein said neck portion includes an inward-flanged neck part.

3. The method of claim 1 wherein the plastic material is selected from the group consisting of polyvinyl chloride and acrylonitrile based plastic.

4. The method of claim 1 wherein the mandrel has a diameter which is 4–12% greater than the diameter of the opening.

5. The method of claim 4 wherein the rate of insertion of the mandrel into the opening and the period of time the mandrel is maintained in the opening is sufficient to cause an increase of from 0.5 to 3.0% in diameter of the opening after the mandrel is withdrawn.

6. The method of claim 5 wherein the temperature of the container is from 25 to 75° C.

7. The method of claim 6 wherein said neck portion includes an inward flanged neck part.

8. The method of claim 7 wherein said mandrel has a cylindrical circumferential surface and a hemispherical end portion.

* * * * *